INVENTOR.
LEE R. CARTER
BY Newton, Hopkins, Jones & Ormsby
ATTORNEYS

May 12, 1970

L. R. CARTER 3,511,389

VEHICLE PARKING APPARATUS WITH A PLURALITY
OF ROTATABLE SUPPORT MEMBERS

Filed June 24, 1966

INVENTOR.
LEE R. CARTER
BY *Newton, Hopkins,
Jones & Ormsby*
ATTORNEYS

United States Patent Office 3,511,389
Patented May 12, 1970

3,511,389
VEHICLE PARKING APPARATUS WITH A PLURALITY OF ROTATABLE SUPPORT MEMBERS
Lee R. Carter, 1160 Ewing Place SW.,
Atlanta, Ga. 30331
Filed June 24, 1966, Ser. No. 560,204
Int. Cl. E04h *6/06, 6/12*
U.S. Cl. 214—16.1
2 Claims

ABSTRACT OF THE DISCLOSURE

A vehicle parking apparatus comprising a vertically extending sectional track and vertical spaced storage areas positioned beside the track. Alternate sections of the track are removable from the track and platforms mounted on substitute tracks sections are movable from the storage areas onto the track for movement along the track.

Background of the invention

In the typical, present day megalopolis, space for parking automotive vehicles have become very scarce. With the price of real estate being so high, tall buildings are being built to gain a maximum floor area for a minimum area of real estate. Of course, tall buildings tend to concentrate a large number of people in a small area. If a high percentage of these people operate automobiles or other vehicles, the parking of these vehicles within a reasonable distance of the tall buildings in which the people are located becomes a problem. Accordingly, a need has been felt for apparatus that would economically and expediently elevate and store automotive vehicles at various elevations so that only a small amount of real estate must be provided to store a high number of vehicles. While several machines have been developed in the past in an attempt to provide such a function, they have been found expensive, difficult to operate, and in most instances, when a vehicle from a high elevation was to be removed from storage, those vehicles located below the first vehicle also had to be removed or otherwise adjusted in position. Of course, this manner of operation has been found cumbersome, slow and requires the attention of more than one attendant.

Summary of the invention

This invention comprises a method and apparatus for expediently and economically storing automotive vehicles at various elevations whereby a vehicle at a higher elevation can be removed from its storage area without moving or otherwise disturbing those vehicles stored at a lower elevation. A plurality of vertically aligned storage areas are provided for vehicles to be stored, a pair of upwardly extending tracks are located in the vicinity of the storage areas, a platform connected to an upwardly extending track section is provided for each storage area and means are provided for removing a section of the first mentioned track and replacing it with the track section of a platform, whereby the platform can be raised and lowered on its section of track and the first mentioned track.

Thus, it is an object of this invention to provide a method and apparatus for storing automotive vehicles in vertical disposition with respect to each other.

Another object of this invention is to provide a method of elevating automotive vehicles to a predetermined elevation, and moving said vehicles in a horizontal direction away from its path of elevation whereby other vehicles can be elevated to a higher position.

Another object of this invention is to provide vehicle parking apparatus having a plurality of vehicle storage platforms movable along an upwardly extending track to a predetermined elevation, and movable horizontally with respect to said track to a position remotely disposed from said track.

Another object of this invention is to provide a method and apparatus for storing vehicles that is economical in construction, economical in operation, expedient in operation, requiring a minimum of attention from persons in attendance, and is well designed to meet economics of expedient commercial manufacture.

Other objects, features and advantages of the present invention will become apparent upon reading the following disclosure, taken in conjunction with the accompanying drawing, in which:

Description of the preferred embodiment

Figure 1:
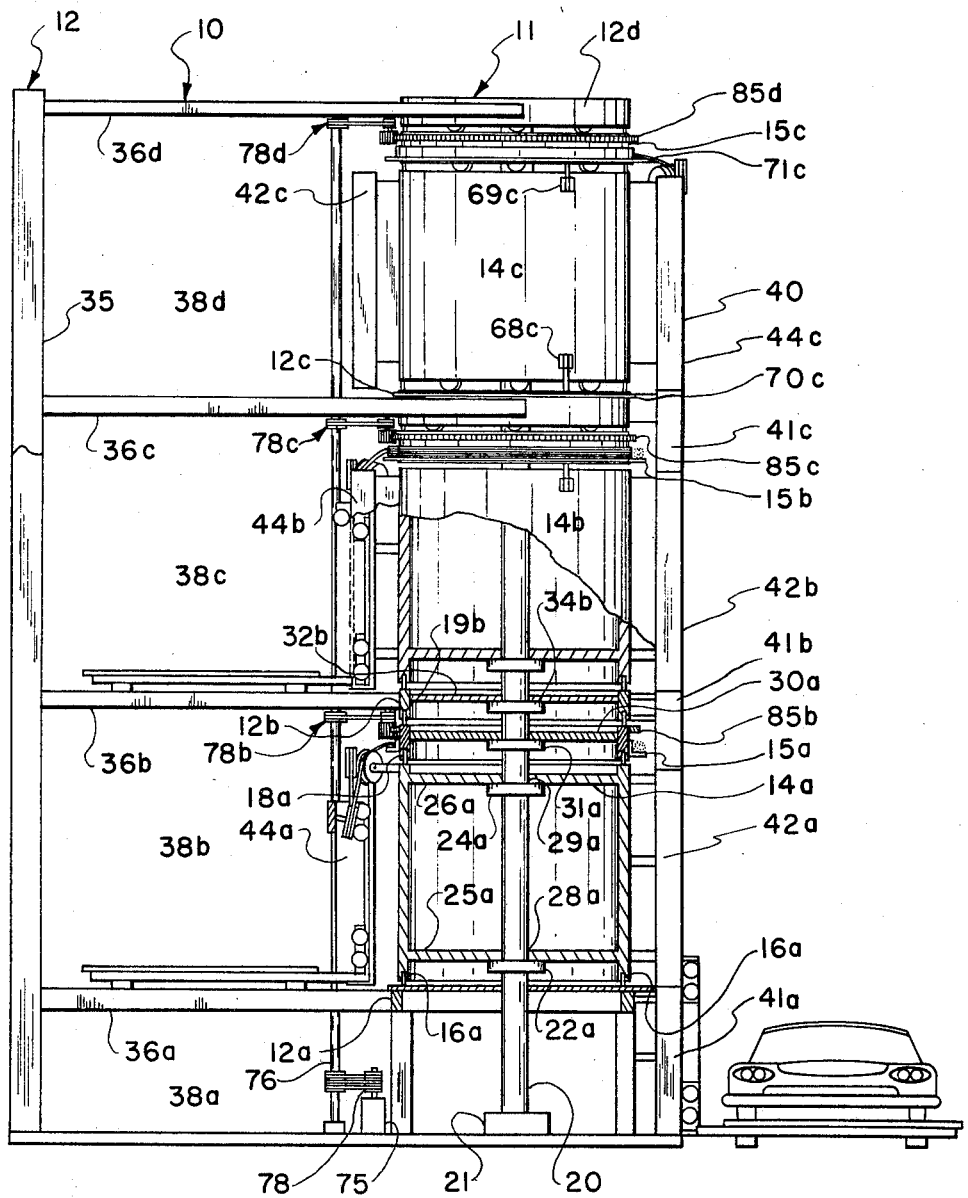
FIG. 1 is an elevational view, with parts broken away, of the vehicle parking apparatus.

Referring now more particularly to the drawing, in which like numerals indicate like parts throughout the several views, FIG. 1 shows vehicle parking apparatus 10 having a center column 11 and a support structure 12. The center column 11 includes a plurality of stationary cylindrical support cylinders 12a, 12b and 12c, a plurality of rotatable vehicle support cylinders 14a, 14b and 14c, and a plurality fo cable drums 15a, 15b and 15c. The stationary support cylinder 12a is positioned at ground level and supports the rotatable vehicle support cylinder 14a by means of a plurality of bearing 16a. The bearings 16a are secured to the vehicle support cylinder 14a at its bottom annular periphery and ride over the upper annular periphery of the stationary support cylinder 12a. The cable drum 15a is positioned above the vehicle support cylinder 14a and is supported by the vehicle support cylinder and rotatable relative thereto by means of the bearings 18a which are constructed and arranged in a manner similar to the bearings 16a. The stationary support cylinder 12b, positioned above the cable drum 15a, includes bearings 19b that engage the cable drum 15a in a manner similar to bearings 18a and 16a.

The rotatable vehicle support cylinders 14b and 14c, cable drums 15b and 15c, and stationary support cylinders 12b and 12c are constructed in a manner similar to those previously described.

A stationary shaft 20 is disposed centrally of the center column 11 and is supported at ground level by the pillow block 21. The stationary shaft 20 includes a plurality of projections thereon throughout its elevation. Projections 22a and 24a on the shaft 20 are positioned in the vicinity of the rotatable vehicle support cylinder 14a. The vehicle support cylinder 14a includes a pair of centrally apertured discs 25a and 26a that are vertically displaced from each other. The discs 25a and 26a extend inwardly of the vehicle support cylinder 14a and their apertures 28a and 29a surround the stationary shaft 20, immediately above the projections 22a and 24a, respectively. Thus, the discs 25a and 26a rest on the projections 22a and 24a of the stationary shaft 20 in such a manner that the stationary shaft 20 tends to assist in the support of the vehicle support cylinder 14a.

Cable drum 15a also includes an internal centrally apertured disc 30a, of a configuration similar to discs 25a and 26a. Disc 30a rests on projection 31a of the stationary shaft 20 to aid in the support of cable drum 15a.

Stationary support cylinder 12b also includes a centrally apertured internal disc 32b arranged to rest on projection 34b of the stationary shaft 20 whereby a portion of the weight from the stationary support cylinder is supported by the stationary shaft 20.

The remaining stationary support cylinders, rotatable vehicle support cylinders and cable drums are constructed in similar manners so that the stationary shaft 20 partially supports each of these elements.

The support structure 12 includes vertically extending members 35 extending the entire height of the center column 11 and horizontally extending support beams 36a, 36b, 36c, and 36d, extending between the vertical support members 35 and each of the stationary support cylinders 12a–d. The horizontally disposed support beams 36a–d are in vertical alignment with each other and define vehicle storage areas 38a–d therebetween; vehicle storage area 38a being positioned between horizontally disposed support beam 36a and ground level. Storage area 38a can be utilized to park a vehicle or can be reserved for storage of equipment. If used for vehicle parking the support beam can be positioned at a height of approximately ten feet above ground level.

Extending vertically of the center column 11 is a pair of tracks 40. The tracks 40 extend from ground level of the vehicle storage apparatus, upwardly to the upper portion of the rotatable vehicle support cylinder 14c. The tracks 40 are divided into sections, sections 41a, 41b, and 41c being connected to and supported by stationary support cylinders 12a, 12b and 12c while sections 42a, 42b and 42c are connected to and supported by the rotatable vehicle support cylinders 14a, 14b and 14c, respectively.

The rotatable vehicle cylinders 14a–c each have connected thereto and support replaceable track sections 44a, 44b and 44c, respectively. The replaceable track sections are identical in construction to track sections 42a–c, and are positioned diametrically opposite to track sections 42a–c, on their respective vehicle support cylinders 14a–c.

Figure 2:
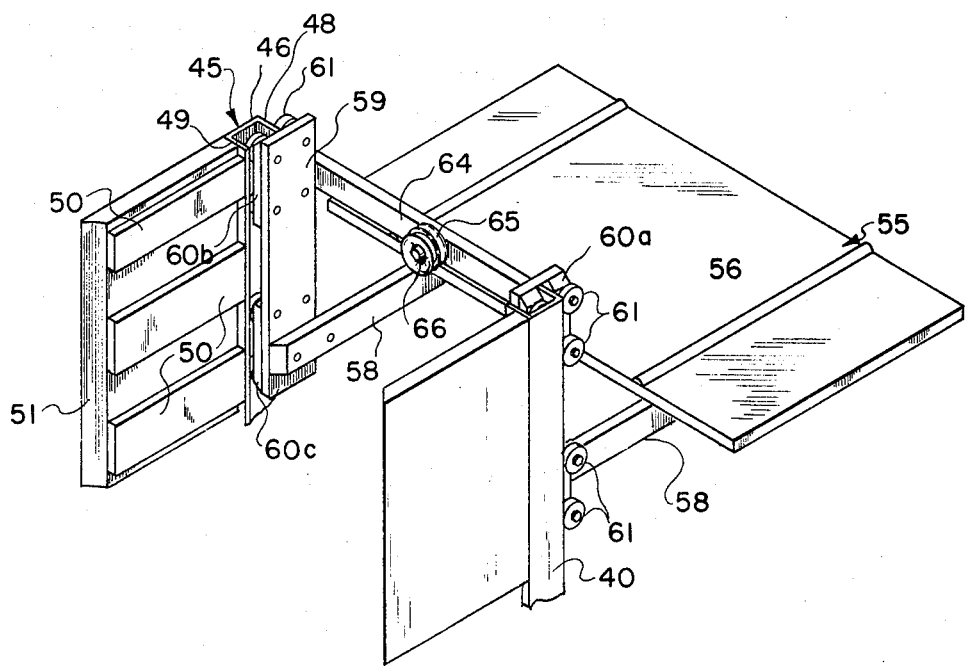
FIG. 2 is a perspective view of a single platform and its track section of the vehicle parking apparatus.

As is best shown in FIG. 2, the pair of tracks 40, which includes the track sections 41a–c and 42a–c, and the replaceable track sections 44a–c, are constructed of U-shaped beams 45 having base portions 46, outer legs 48 and inner legs 49. The beams of each track are disposed so that their legs 48 and 49 face each other. The U-shaped beams 45 are each supported from their respective vehicle support cylinders or stationary support cylinders by means of a plurality of support blocks 50 extending from the inner legs 49 to their respective support cylinders. Also, a support panel 51 is disposed outwardly of the support blocks 50 and the U-shaped beams 45 are connected to the U-shaped beams and support blocks, and to their respective support cylinders to assist in the support of the U-shaped beams. With this construction, the tracks 40 are stoutly supported by the support cylinders of the center column 11 so that the weight of a vehicle supported by a portion of the track will not cause that portion of the track to be misaligned with the remaining portions of the tracks.

A vehicle support platform is constructed to engage the tracks 40 of the center column 11. The vehicle support platform 55 includes a horizontal support 56 supported by a pair of support beams 58. Support beams 58 are, in turn, connected to a vertically disposed bearing pillow 59. The bearing pillow 59 is connected to bearing blocks 60a, 60b, 60c, 60d (not shown), which support roller bearings 61. Sets of roller bearings 61 are connected to each bearing block 60a–d in such a manner that the bearings 61 of each bearing block 60a–d are disposed outwardly of the outer leg 48 of the U-shaped beam 45 and between the legs 48 and 49 of the U-shaped beam 45. With this construction, the roller bearings 61 of the bearing blocks 60a–d will engage the inner surfaces of the legs 48 and 49 of the U-shaped beam 45, and the outer surface of the outer leg 48 of the U-shaped beam 45. A pulley support 64 is disposed in a horizontal plane and extends between the bearing pillows 59 of the vehicle support platform 55. A pulley 65 is connected to the pulley support by means of its axle 66 extending in a horizontal plane therethrough. Thus, the roller bearings 61 of the vehicle support platform 55 are maintained in engagement with the tracks 40 of the center column 11 by means of the support beams 58 and pulley support 64 positioning the bearing pillows 59 a proper distance apart.

As is shown in FIG. 1, the rotatable vehicle support cylinder 14a–c are connected to the stationary support 12a–c by means of a solenoid actuated connecting pin, such as connecting pin 68c of the support cylinder 14c. Also, the rotatable vehicle support cylinders 14a–c are connected to cable drums 15a–c by means of solenoid actuated connecting pins, such as pin 69c of support cylinder 14c. The connecting pins 68a–c extend through an aperture in annular flanges disposed about the upper perimeter of the stationary support cylinders, such as annular flange 70c of support cylinder 14c. The connecting pins 69a–c extend through apertures defined in annular flanges disposed about the lower perimeter of cable drums 15a, such as annular flange 71c of rotatable vehicle support cylinder 14c. With this construction, it can be seen that when the solenoid of connecting pin 68c is energized, vehicle support cylinder 14c is capable of rotating relative to stationary support cylinder 12c. Similarly, when the solenoid of connecting pin 69c is energized, the pin will be withdrawn from flange 71c so that vehicle support cylinder 14c is capable of rotating with respect to cable drum 15c. The remaining vehicle support cylinders and their adjacent stationary support cylinders and cable drums are constructed in a similar manner so that they can be selectively connected to or disconnected from each other.

Figure 4:
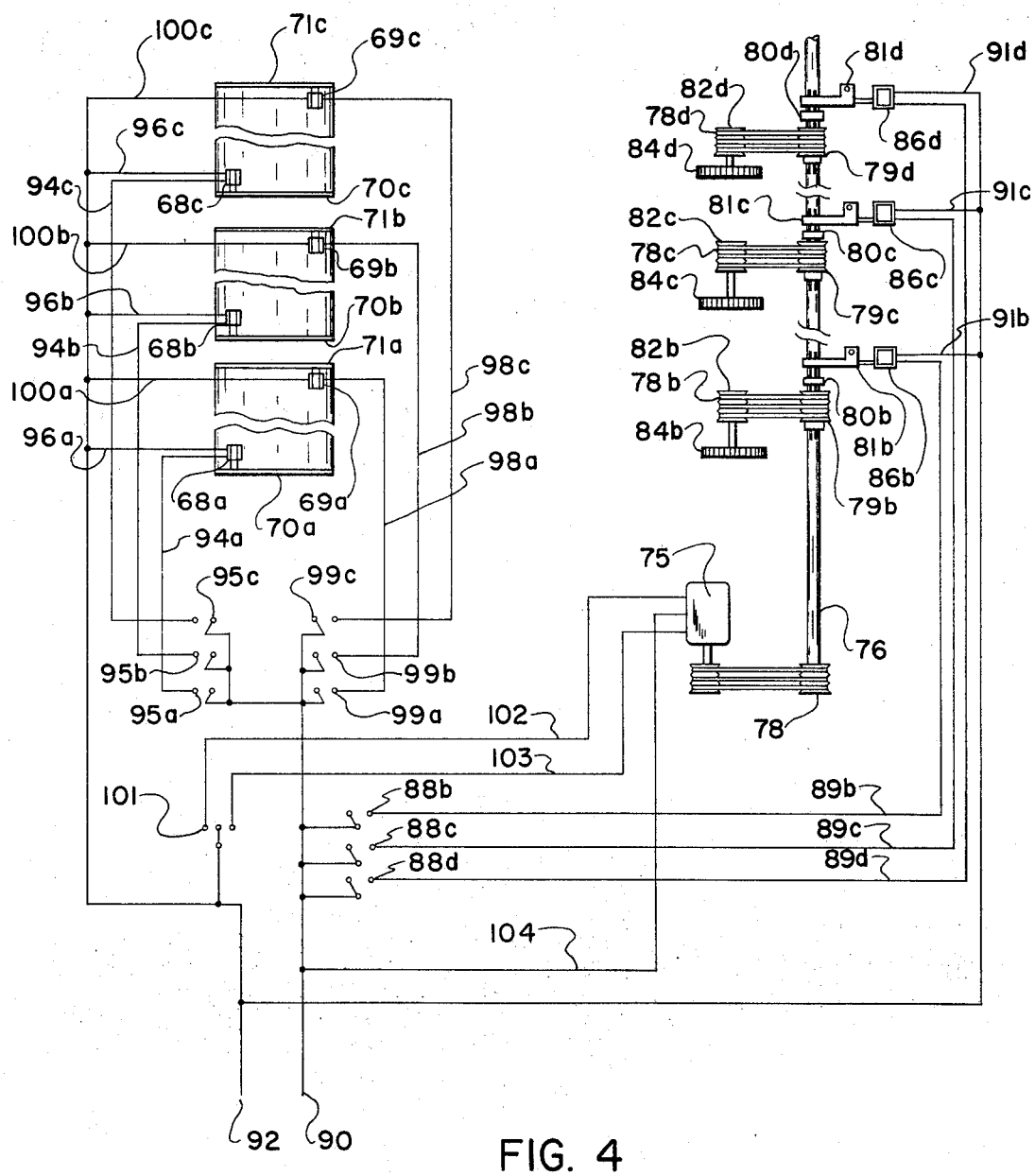
FIG. 4 is a schematic representation of the electrical system utilized to operate the vehicle parking apparatus.

As is best shown in FIGS. 1 and 4, an electric motor 75 is positioned at the base of the center column 11, in the storage area 38a. The motor 75 is connected to a vertically extending rotatable shaft 76 through means of a conventional multi-belt drive system 78. The shaft 76 extends the entire height of the vehicle support apparatus and is rotatably connected to each of the horizontally disposed support beams 36a–d. Horizontally disposed support beams 36b–d also each support power takeoff apparatus 78b, 78c and 78d. The power takeoff apparatus for each section of the center column 11 comprises an idler sheave 79b, 79c and 79d, a clutch pressure plate 80b, 80c and 80d, clutch engaging fork 81b, 81c and 81d, a driven sheave 82b, 82c and 82d, and spur gear 84b, 84c and 84d. The spur gear of each section is constructed to engage an annular gear train, such as annular gear train 85b, 85c and 85d disposed about its respective rotatable vehicle support cylinder.

The clutch engaging fork 81b–d are controlled by solenoids 86b–d, whereupon energization of a solenoid causes movement of its respective fork to move the pressure plate into engagement with the idler sheave of its respective power takeoff apparatus. Since the pressure plates 80b–d can move axially of the rotatable shaft 76 but not thereabout, the engagement of the pressure plates with the idler sheaves causes them to rotate with the rotatable shaft 76. Of course, this causes the driven sheave and its respective spur gear to rotate accordingly.

The solenoids 86b–d are connected to switches 88b–d through wires 89b–d to one side 90 of a source of electricity, and connected by means of wires 91b–d to the other side 92 of the source of electricity. Accordingly, the closing of any of the switches 88b–d will cause the solenoids 86b–d to move the pressure plate 80b–d into engagement with its respective idler sheave to cause rotation of its respective spur gear 84b–d.

The solenoids of connecting pins 68a–c and 69a–c are also connected to the same source of electricity. The solenoids of connecting pins 68a–c are connected through wires 94a–c to switches 95a–c, to one side 90 of the source of electricity and to the other side by means of wires 96a–c. The solenoids of actuating pins 69a–c are connected by means of wires 98a–c to switches 99a–c to one side 90 of the source of electricity, and to the other side 92 by means of wires 100a–c. With this arrangement, the closing of any of the switches 95a–c or 99a–c will cause the solenoid of connecting pins 68a–c or 69a–c to be energized, thus removing the connecting pins from their respective apertures of their flanges 70a–c or 71a–c.

The electric motor 75 is reversible, and a double throw switch 101 is connected thereto by means of wires 102 and 103. The wires 102 or 103 are alternately connected to one side 92 of the source of electricity, while the wire 104 connects the motor 75 to the other side 90 of the source of electricity. With this ararngement, when the switch 101 is connected to the wire 102, the electric motor will run in one direction, and when connected to the other wire, wire 103, the electric motor will run in the reverse direction.

Figure 3:
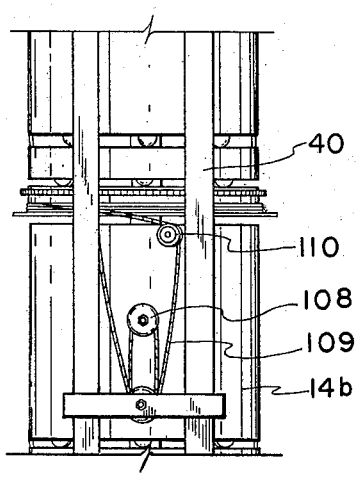
FIG. 3 is a partial elevational view of the center column of the vehicle parking apparatus.

Referring now to FIG. 3, it can be seen that each rotatable vehicle support cylinder 14a–c includes a pully 108 connected thereto and disposed intermediate its tracks 40. The pulley 108 is free to rotate, and a cable 109 is wound therearound. The cable 109 is anchored to one of the supports of the track 40 and extends around the pulley 65 of the vehicle support platform 55, upwardly around the pulley 108, downwardly around in the pulley 65, and upwardly and over the pulley 110. Pulley 110 is supported from the rotatable vehicle support cylinder. The cable 109 then extends around the periphery of the cable drum disposed above the vehicle support cylinder, and its end is anchored thereto. With this construction, it can be seen that when the cable drums 15a–c are allowed to rotate with respect to the rotatable vehicle support cvlinders 14a–c, the cables 109 will be played out toward or reeled inwardly from the pulleys 108 and 65. Thus, the vehicle support platform of its respective rotatable vehicle support cylinder will be raised or lowered over the tracks 40, depending upon the direction of rotation of the cable drum with respect to the vehicle support cylinder.

Operation

When the vehicle storage apparatus is at rest, the vehicle support platforms 55 are disposed in their respective storage areas 38b–d. When it is desired to move the vehicle support platform from its storage area, as is shown in FIG. 1, the operator energizes the reversible motor 75 by moving its switch 101 into connection with one of its contact elements to drive the rotatable shafts 76 through drive means 78. The solenoid of connecting pin 68c is energized by closing switch 95c, thereby withdrawing the connecting pin 68c from its aperture defined in annular flange 70c. Solenoid 86d is then energized by closing switch 88d, whereupon the rotatable pressure plate 80d is urged into engagement with the idler sheave 79b. This causes the idler sheave 79b to rotate in unison with the rotatable shaft 76, causing spur gear 84d to rotate. Since the spur gear 84d is in engagement with the annular gear train 85d disposed about cable drum 15c, and since the connection pin 69c connects cable drum 15c with rotatable vehicle support cylinder 14c, the rotatable vehicle support cylinder 14c, cable drum 15c, and their respective support platform rotates about the center column 11. After the connecting pin 68c has cleared its aperture, the operator opens its switch 95c whereupon it engages the surface the annular flange 70c upon further movement of the rotatable vehicle support cylinder about the center column 11. When the support platform 55 has been moved to the position where its U-shaped beams 45 are in vertical alignment with the tracks 40, the connecting pin 68c comes into engagement with another aperture (not shown) of the annular flange 70c, to stop the rotation of the vehicle support cylinder. The operator then closes switch 99c to energize the solenoid of connecting pin 69c, whereupon the connecting pin 69c is withdrawn from the aperture defined in annular flange 71c. Further movement of the rotatable shaft 76 continues to rotate the cable drum 15c, while rotatable vehicle support cylinder 14c remains stationary. This tends to unwind the cable 109c from the cable drum 15c, whereupon the vehicle support platform 55 is lowered to the position as shown in FIG. 1.

When a vehicle has been placed upon the vehicle support platform 55, the motor 75 is reversed by reversing the position of its switch 101, so that the rotatable shaft 76 is rotated in a direction opposite to its former rotation. This rotates the cable drum 15c in its opposite direction to reel in the cable 109c, thereby raising the vehicle platform 55. When the vehicle platform has been raised to the point where it engages its replaceable tracks 44c, the connecting pin 69c comes into engagement with its aperture defined in the annular flange 71c of the cable drum 15c, thereby stopping the movement of the vehicle support platform. The operator then closes switch 95c to energize the solenoid of connecting pin 68c, so that connecting pin 68c is withdrawn from its aperture in annular flange 70c, whereupon further movement of the cable drum 15c rotates the vehicle support cylinder 15c until the vehicle support platform, and the vehicle supported thereon, reaches its storage area 38d, whereupon the connecting pin 68c is allowed to drop into another aperture in the annular flange 70c. Of course, when the vehicle support platform is properly disposed in its storage area, the section 44c of the track 40 will be disposed in its proper position, that is, in alignment with the remaining sections of track 40.

The remaining portions of the vehicle storage apparatus work in a similar manner, and further explanation of the various elements at this point would be redundant.

With this construction, it can be seen that when the vehicle support platform of each section of the vehicle storage apparatus is in its storage area, the replaceable tracks of each section will be in alignment with the remaining sections of the tracks 40 so that a continuous track is maintained throughout the entire height of the apparatus. Thus, if it is desired to store or retrieve a vehicle from any given storage area, it can be done without interference of the remaining stored vehicles. Furthermore, a single operator standing at a centrally disposed control panel can operate the apparatus.

While the invention has been shown with three storage levels, it should be understood that any number of storage levels can be attained. Furthermore, while the electrical diagram shown in connection with the invention is rather basic, it should be understood that more sophisticated controls could easily be incorporated. Such controls might include the automatic energization of various ones of the switches 95a–c and 99a–c upon certain conditions or stages of the apparatus. While a single reversible motor 75 has been shown, it should be understood that a plurality of motors can be utilized to obviate the necessity of the clutches, their associated components, and the long shaft 76. While cables 109 have been utilized to elevate the support platforms 55, it is believed to be in purview of this invention to utilize gear trains or pneumatic elevating means.

What is claimed as the invention is:
1. Vehicle parking apparatus comprising:
  a vertically extending support shaft,
  a plurality of projections extending outwardly from said support shaft,
  a stationary support platform,
  a vehicle support cylinder rotatably supported by said vertically extending shaft, its said projections and said support platform,
  a cable cylinder rotatably supported by said vertically extending shaft, its said projections and said vehicle support cylinder, means for connecting said vehicle support cylinder to said stationary platform, means for connecting said vehicle support cylinder to said cable cylinder, a pair of vertically extending stationary tracks connected to said stationary platform, a first pair of vertically extending tracks connected to said vehicle support cylinder being constructed and arranged to be placed in alignment with said stationary tracks, a second pair of vertically extending tracks connected to said vehicle support cylinder being constructed and arranged to be placed in alignment with said stationary tracks, vehicle support means connected to said second pair of tracks, means for alternately placing either said first pair or said second pair of tracks in alignment with said stationary tracks, and means for lowering and raising said vehicle support means over said second pair of tracks and said stationary tracks when said second pair of tracks are in alignment with said stationary tracks.

2. Storage apparatus comprising a stationary frame work defining a plurality of article support areas, a stationary frame work, an upwardly extending sectional track assembly adjacent said frame work and including a series of spaced stationary track sections, a rotatable support member positioned intermediate adjacent ones of said stationary track sections, replaceable track sections connected to said support members and normally positioned in alignment with said stationary track sections, substitute track sections connected to said support members and normally positioned out of alignment with said stationary track sections and within the confines of said frame work, a load handling means normally carried by each of the substitute track sections and supported within the confines of said frame work, power means, a power takeoff means connected between each of said support members and said power means for rotating each of said support members independently of the others to move its replaceable track section out of alignment with said stationary track sections and to move its substitute track section and load handling means out of the confines of said frame work and into alignment with said stationary track sections, elevating means connected to each of said load handling means and independently operated by said power means whereby each of said load handling means are movable independently of the other load handling means in upward and downward directions below its substitute track section along the stationary and replaceable track sections.

References Cited

UNITED STATES PATENTS

| | | |
|---|---|---|
| 633,215 | 9/1899 | Poulson. |
| 2,682,958 | 7/1954 | Francis. |
| 2,849,127 | 8/1958 | Densmore. |
| 3,027,024 | 3/1962 | Baume. |

GERALD M. FORLENZA, Examiner

R. B. JOHNSON, Assistant Examiner

U.S. Cl. X.R.

214—730